(12) United States Patent
Ramsden et al.

(10) Patent No.: US 8,374,993 B2
(45) Date of Patent: Feb. 12, 2013

(54) RADIOACTIVE ISOTOPE IDENTIFICATION

(75) Inventors: David Ramsden, Southampton (GB); Matthew Dallimore, Boxborough (GB); Grant Crossingham, Winchester (GB)

(73) Assignee: Symetrica Limited, Southampton, Hampshire (GB)

( * ) Notice: Subject to any disclaimer, the term of this patent is extended or adjusted under 35 U.S.C. 154(b) by 725 days.

(21) Appl. No.: 12/522,696

(22) PCT Filed: Oct. 16, 2007

(86) PCT No.: PCT/GB2007/003917
§ 371 (c)(1),
(2), (4) Date: Oct. 20, 2009

(87) PCT Pub. No.: WO2008/087368
PCT Pub. Date: Jul. 24, 2008

(65) Prior Publication Data
US 2010/0121811 A1    May 13, 2010

(30) Foreign Application Priority Data

Jan. 15, 2007 (GB) .................................. 0700749.5

(51) Int. Cl.
G06F 15/00 (2006.01)
G06F 15/18 (2006.01)
(52) U.S. Cl. .................. 706/62; 706/20; 706/45
(58) Field of Classification Search .................. None
See application file for complete search history.

(56) References Cited

U.S. PATENT DOCUMENTS 5,866,907 A * 2/1999 Drukier et al. ............... 250/366
6,492,642 B1 12/2002 Belanov et al.
6,864,089 B2 3/2005 Figeys et al.
7,756,646 B2 * 7/2010 Kangas et al. ............... 702/22
8,173,970 B2 * 5/2012 Inbar ..................... 250/390.07
(Continued)

FOREIGN PATENT DOCUMENTS

| WO | WO 02/31536 | 4/2002 |
| WO | WO 2004/006159 | 1/2004 |
| WO | WO 2005/116691 | 12/2005 |

OTHER PUBLICATIONS

"Gamma-Ray Identification of Nuclear Weapon Materials", T.B. Gosnell et al.; Lawrence Livermore National Laboratory; Feb. 3, 1997; 56 Pages.
"A Method for Automatic Identification of Peaks in the Presence of Background and Its Application to Spectrum Analysis", M.A. Mariscotti; Brookhaven National Laboratory; Aug. 15, 1966; pp. 309-320.

*Primary Examiner* — Omar Fernandez Rivas
(74) *Attorney, Agent, or Firm* — O'Melveny & Myers LLP (57) ABSTRACT

A method of identifying radioactive components in a source comprising (a) obtaining a gamma-ray spectrum from the source; (b) identifying peaks in the gamma-ray spectrum; (c) determining an array of peak energies and peak intensities from the identified peaks; (d) identifying an initial source component based on a comparison of the peak energies with a database of spectral data for radioactive isotopes of interest; (e) estimating a contribution of the initial source component to the peak intensities; (f) modifying the array of peak energies and peak intensities by subtracting the estimated contribution of the initial source component; and (g) identifying a further source component based on a comparison of the modified array of peak energies with the database of spectral data. Thus a method for identifying radioactive components in a source is provided which does not rely on comparing template spectra with an observed spectrum.

19 Claims, 4 Drawing Sheets

U.S. PATENT DOCUMENTS

| | | |
|---|---|---|
| 2005/0151084 A1* | 7/2005 | Zibulevsky et al. ..... 250/363.03 |
| 2006/0284094 A1* | 12/2006 | Inbar .......................... 250/359.1 |
| 2007/0294059 A1* | 12/2007 | Gentile et al. ................ 702/189 |
| 2008/0033291 A1* | 2/2008 | Rousso et al. ................ 600/436 |
| 2008/0296519 A1* | 12/2008 | Larsen et al. .............. 250/515.1 |
| 2009/0147920 A1* | 6/2009 | Barty et al. ..................... 378/88 |

* cited by examiner

RADIOACTIVE ISOTOPE IDENTIFICATION

BACKGROUND ART

The invention relates to methods and apparatus for radioactive isotope identification, and in particular to identifying radioactive isotopes from their gamma-ray emission spectra.

Different risks are associated with different radioactive sources. Because of this it is often important to be able to identify the nature of a source of gamma-rays (i.e. which radioactive isotope(s) which are present). Device for doing this are generally known as radioactive-isotope identifying devices (RIDs). RIDs may be hand-held scanning devices, or larger fixed devices, such as portal monitors for people or vehicles to pass through.

RIDs are useful in a number of situations. For example, they can be used to monitor legitimate uses of radioactive material and to maintain an awareness of isotopes present in an environment where radioactive material is used. This can be important, for example, in medical and industrial applications. RIDs can also be used as general scanning devices to identify "orphaned" or other unknown radioactive sources in an environment. Furthermore, an ever increasingly important area of use for RIDs is in policing the illegitimate trafficking of nuclear materials.

Policing illegitimate trafficking of nuclear materials is one of the most challenging areas for isotope identification. This is because it often requires large numbers of people and cargos to be scanned quickly (for example as they pass through a facility such as a port, or other border crossing, at normal speed), but with a high degree of reliably. Not only is there the clear desire to be able to reliably correctly identify undesirable radioactive isotopes, e.g. plutonium, passing through a facility, it is also important that legitimate sources of radiation are not wrongly identified as undesirable sources. This is because false-alarms arising from the kind of misidentification at border crossings, for example, can be very costly, both financially in terms of lost operation time while the alarm is investigated, and in terms of the degree of inconvenience to people passing through the facility.

However, it can be difficult to avoid false-alarms because many legitimate sources of naturally occurring gamma-ray radiation may be present where undesirable sources of radiation are being sought. For example, sanitary ware, roofing tiles, cat litter and scouring pads, which are all common sources of naturally occurring radiation, frequently pass through border crossings in the course of normal trade. What is more, some legitimate sources of radiation have features in their gamma-ray emission spectra which are similar to those in some undesirable sources. For example, radioactive isotopes of iodine (for medical use) and barium (for industrial use) both emit gamma-rays at energies which are similar to gamma-rays from weapons grade plutonium. Not only does this mean that innocent cargos may give rise to false-alarms, it also means that those involved in illegitimate trafficking of nuclear materials could seek to mask weapons grade plutonium by hiding it among a cargo of medical iodine, for example. Because of this, there is a desire for RIDs to be as accurate and reliable as possible.

RIDs typically comprise a gamma-ray spectrometer component and a processor component. The gamma-ray spectrometer component is for obtaining gamma-ray emission spectra from objects under investigation. The processor component is for determining the most likely source of the gamma-rays (i.e. the radioactive isotopes present) on the basis of characteristics of the spectra obtained.

One class of RID currently in use is based on high-purity germanium (HPGe) detectors, for example the Detective-EX-100® RID from the ORTEC Corporation. Another class is based on room temperature semiconductor detectors, such as cadmium zinc telluride (CdZnTe or CZT), for example the Interceptor™ RID from the Thermo Electron Corporation. Both types of spectrometer are able to provide high-resolution gamma-ray spectra (which is key to reliable isotope identification). Another class of RID comprises those based on scintillation spectrometers.

Each of these classes of RID have advantages and drawbacks. For example, HPGe and CZT detectors are able to provide high resolution spectra which allows similar source spectra to be distinguished. However, HPGe and CZT detectors are also typically small volume devices. This makes them difficult to implement in large RIDs of the kind required by some applications, e.g. for quickly scanning lorries passing through a port. HPGe detectors also require cooling. This adds to their weight, cost and complexity, and can make it difficult to implement and support them in portable hand-held applications. Scintillation-body based spectrometers, on the other hand, are relatively cheap and easy to implement on both small (e.g. portable hand-held RIDs) and large (e.g. vehicle portal monitor RIDs) scales, but have relatively low intrinsic spectral resolution and relatively low signal-to-noise ratios. Because of this, HPGe and CZT-based spectrometers have generally been seen as preferable to scintillation-body based spectrometers for use in RIDs.

Once a gamma-ray spectrum has been obtained using the spectrometer component of the RID, the spectrum is analysed by the processor component of the RID to identify what isotope(s) are the most likely source(s) of the observed spectrum. To some extent this process is independent of which class of spectrometer is employed in the spectrometer component of the RID.

One way of analysing the measured gamma-ray spectrum is by a full spectrum analysis. According to this approach, the processor component of the RID cycles through a collection of "templates" (i.e. pre-computed gamma-ray signatures for nuclear materials expected to be encountered) and compares them with the observed spectrum, for example using a correlation function. Identification is made by choosing the template, or linear combination of templates, which best matches the observed spectrum.

There are, however, a number of drawbacks with this approach. Firstly, it is computationally intensive. This can be especially problematic in portable hand-held devices where processing capability is more restricted than in larger fixed installations. Secondly, the templates can only accurately reflect the gamma-ray signatures from particular isotopes under given laboratory conditions. The gamma-ray signature from a source "in the real world" is likely to be different to that seen in the laboratory. This is because the recorded spectrum will be affected by scattering and absorption within materials surrounding the source, and also will be affected by the specific geometry of the source being investigated, and its orientation with respect to the RID. These effects are generally energy dependent. This means the recorded spectrum for a given isotope will not normally properly match the stored laboratory-conditions template for that isotope. For example, the template for a given isotope may include two emission lines of similar intensity, one at a relatively low energy, and one at a relatively high energy. If this isotope is in a person's hand luggage, it is likely that both lines would be seen with similar intensities, and the isotope could properly be identified from this. However, if the isotope is carried through a portal monitor hidden in a cargo of concrete, the low energy line would be adsorbed more than the high energy line and the recorded spectrum would not match the template. This makes it more difficult to properly identify the isotope and so can lead to mis-identification. For example, it means relatively loose constraints must be used for making a positive identification of an isotope (e.g. a relatively low correlation coefficient between the recorded spectrum and the template). This leads to increased likelihood of false-positive alarms. Accordingly, this kind of full spectrum analysis is inflexible because it cannot take proper account of how the gamma-ray signatures from a source are modified by the environment in which they are measured.

An alternative approach for identifying isotopes from a gamma-ray spectrum is the so-called single multi-component analysis method [1]. In this method, the starting point is again the computation of a range of template spectra for isotopes expected to be encountered in the application at hand. The most likely source composition is then determined from a principle component analysis of the recorded gamma-ray emission spectrum from the source. Multiple templates are provided for each potential radio-nuclide. The multiple templates correspond to the different predicted signatures from each isotope for a range of different shielding materials and geometries. For example, one template might correspond to unshielded plutonium, while another might correspond to plutonium shielded by 2 metres of concrete. This approach can help to address some of the problems which arise from the same radioactive source isotope giving rise to different recorded gamma-ray spectra in different situations.

However, relying on multiple templates for each isotope in this way increases further still the computational power required to implement the method in a reasonable time (for example in the time taken for a person to walk past a detector). Furthermore, the method still necessarily employs a finite number of templates to model what is in effect an infinite number of different shielding and geometry arrangements. This means it is still not possible to fully account for all of the different ways in which a recorded gamma-ray spectrum can be affected by the environment. Accordingly, ambiguities in isotope identification can still arise.

There is therefore a need for a method of identifying isotopes which is less computationally intensive than known methods, and which is also less prone to false identifications (false alarms) caused by environmental effects modifying the observed spectra so that isotope identification can be made with a greater degree of confidence.

SUMMARY OF THE INVENTION

According to a first aspect of the invention there is provided a method of identifying radioactive components in a source, the method comprising: (a) obtaining a gamma-ray spectrum from the source; (b) identifying peaks in the gamma-ray spectrum; (c) determining an array of peak energies and peak intensities from the identified peaks; (d) identifying an initial source component based on a comparison of the peak energies with a database of spectral data for radioactive isotopes of interest; (e) estimating a contribution of the initial source component to the peak intensities; (f) modifying the array of peak energies and peak intensities by subtracting the estimated contribution of the initial source component; and (g) identifying a further source component based on a comparison of the modified array of peak energies with the database of spectral data.

Thus a method for identifying radioactive components in a source is provided which relies on identifying source components based on a comparison of energies of peaks in a gamma-ray spectrum of the source. Because the method does not rely on comparing template spectra, source components can be identified even if the intensities of their associated emission lines are not well matched to the relative line intensities that would be seen for the isotope under laboratory conditions. Thus, the method is able to identify source components even in the event that the source is heavily shielded, or has some of its emission lines swamped by other sources of gamma-rays. Furthermore, because the method is relatively simple, it requires relatively little computing power.

The source component may correspond with a single radioactive isotope, or with more than one radioactive isotope taken in combination. For example, in a given situation there may be a desire to identify the presence of two radioactive isotopes that occur in combination. The emission lines associated with this combination may in effect thus be treated as if they were emission lines from a single isotope.

Step (b) may be performed following spectral deconvolution based on a the use of a full-energy response function. Step (c) may include determining an array of peak energies and peak intensities so that a search can be made of the reference library (database of spectral data) with a precision of 0.01 times the energy of the identified peaks, plus or minus 8 keV, or better.

The method may identify more source components in an iterative manner. For example, the method may further comprise: (h) estimating a contribution of the further source component to the modified array of peak intensities; (i) further modifying the array of peak energies and peak intensities by subtracting the estimated contribution of the further source component; and (j) identifying a still further source component based on a comparison of the further modified array of peak energies with the database of spectral data. The method may furthermore still comprise repeatedly performing steps (h), (i) and (j) to iteratively identify still further source components.

The database of spectral data may include energies and relative intensities for emission lines associated with radioactive isotopes of interest. The database may further include classification information for the emission lines associated with radioactive isotopes of interest. The classification information may thus provide a ranking for the emission lines according to their significance and ability to uniquely identify the isotope with which they are associated.

With such a database, the comparison of the peak energies with the database of spectral data may include selecting a primary peak energy from the array of peak energies, and determining which radioactive isotopes of interest in the database of spectral data include an emission line at an energy corresponding to the selected primary peak energy.

The inventors have found this to be a reliable way of selecting an initial subset of candidate isotopes from the isotopes of interest for further consideration. This can help to reduce the overall computational requirements of the method.

The selected primary peak energy may be the peak energy associated with the identified peak in the gamma-ray spectrum which has the greatest peak intensity, for example.

In other embodiments, the method may include determining whether one of the identified peaks has a peak energy corresponding to 2.6 MeV, and if so, taking this to be the selected primary peak energy. This can be helpful because an emission line at 2.6 MeV in the gamma-ray spectrum is a reliable indicator that the source contains one (or more) of Th-232, U-232, or Th-228, and these are all isotopes often likely to be of particular interest.

The comparison of the peak energies with the database of spectral data may includes determining for a selection of isotopes of interest (for example those found to include an emission line corresponding to the selected primary peak energy in embodiments which implement that feature, or some other selection, e.g. all isotopes of interest) whether an emission line of a first classification in the database for the isotope has an energy that corresponds with one of the peak energies.

Thus emission lines classified in the database according to the first classification may be considered as "key" lines which must be seen in the gamma-ray spectrum for their corresponding isotope to be identified as being present in the source.

The comparison of the peak energies with the database of spectral data may include determining for a selection of isotopes of interest whether a predetermined number of emission lines of a second classification in the database for the isotope have energies which correspond with ones of the peak energies.

Thus emission lines classified in the database according to the second classification may be considered as "critical" lines, a predetermined non-unitary fraction of which must be seen in the gamma-ray spectrum for the corresponding isotope to be identified as being present in the source. In this way, identification can be based on lines which are deemed characteristic of a given isotope, but without requiring all such lines to be present in the gamma-ray spectrum. This allows for a source component to be identified even if some of its most characteristic lines are shielded or swamped.

The inventors have found that good results may be achieved when the comparison of the peak energies with the database of spectral data includes all of selecting a primary peak energy from the array of peak energies, and determining which radioactive isotopes of interest in the database of spectral data include an emission line at an energy corresponding to the selected primary peak energy, determining for those radioactive isotopes of interest in the database of spectral data which include an emission line at an energy corresponding to the selected primary peak energy whether an emission line of a first classification in the database for the isotope has an energy that corresponds with one of the peak energies, and determining for these isotopes whether a predetermined number of emission lines of a second classification in the database for the isotope have energies which correspond with ones of the peak energies. However, other embodiments may employ only one or two of these techniques, for example.

The method may further comprise calculating a goodness-of-fit parameter for the identified source components based on a comparison between the energies and relative intensities of emission lines associated with the identified source components in the database of spectral data, and the peak energies and peak intensities determined from the gamma-ray spectrum. This allows an estimated confidence in the identification to be provided, and may also be used to help distinguish between multiple possible source components.

The estimating the and subtracting the contribution of the initial source component at steps (e) and (f) of the method according to the first aspect of the invention may include identifying a plurality of the peak energies for the peaks in the gamma-ray spectrum corresponding to emission lines in the database for the initial source component, comparing the peak intensities associated with the identified plurality of peak energies with the corresponding relative intensities in the database, identifying the peak in the gamma-ray spectrum having the lowest intensity relative to the relative intensity of its corresponding emission line in the database, and subtracting a contribution from the peak intensities for each of the plurality of peak energies identified as being associated with the initial source component, the amount subtracted from each peak intensity being in accordance with the relative intensities of associated emission lines in the database, and scaled such that the peak in the gamma-ray spectrum having the lowest intensity relative to its corresponding emission line in the database is removed (e.g. set to zero intensity, absolutely or with respect to a determined background level in the vicinity of the peak energy associated with the peak).

In this way, the contribution of emission lines associated with the initial source component can be subtracted from the determined peak intensities in accordance with their expected intensities, but by an amount that is scaled according to the weakest line seen in the gamma-ray spectrum. By scaling the amount to subtract in accordance with the weakest line, there is a reduced risk of overestimating the contribution of the determined initial source component, and so accidentally removing "too much" of the signal. This is useful because it can help to avoid wrongly subtracting all of the peak intensity for a given peak in the gamma-ray spectrum for being associated with the initial source component, when in fact other (as yet unidentified) source components also contribute to that peak. This helps reduce the chance that a source component will be missed because its contribution to the spectrum is dominated by another source component having overlapping emission lines.

Step (a) of the method may comprise obtaining an energy loss spectrum from the source using a scintillation counter based spectrometer, and processing the energy loss spectrum to provide the gamma-ray spectrum. Furthermore, processing the energy loss spectrum may include deconvolving a predetermined response of the scintillation counter to incident gamma rays from the energy loss spectrum.

Alternatively, step (a) may comprise obtaining the gamma-ray spectrum from the source using a room-temperature semiconductor detector, for example, a Cadmiun Telluride based detector.

The method may further comprise providing an output depending on the identified source components. For example, the output may be a display listing identified source components, or an alarm signal in the event that a particular source component of interest is identified.

According to another aspect of the invention there is provided a computer program product comprising machine readable instructions for implementing the method of the first aspect of the invention.

The computer program product may comprise a computer program on a carrier medium, for example a storage medium or a transmissions medium.

According to another aspect of the invention there is provided a computer configured to perform the method of the first aspect of the invention.

According to still another aspect of the invention there is provided an apparatus for implementing the method of the first aspect of the invention. For example, the apparatus may comprise a suitably configured application specific integrated circuit (ASIC), a field programmable gate array (FGPA), or an arrangement of discrete components for executing the method.

The apparatus may further include a gamma-ray spectrometer for obtaining the gamma-ray spectrum, a storage means for storing the database of spectral data, and a processor operable to perform steps (b) to (g).

According to another aspect of the invention there is provided a database of spectral data for use in the method of the first aspect of the invention, the database including entries corresponding to emission lines of radioactive isotopes of interest, the entries including energies and relative intensities for the emission lines, and wherein the emission lines in the database are classified according to a predetermined significance according to their ability to identify the radioactive isotope with which they are associated.

BRIEF DESCRIPTION OF THE DRAWINGS

For a better understanding of the invention and to show how the same may be carried into effect reference is now made by way of example to the accompanying drawings in which.

DETAILED DESCRIPTION

Figure 1:
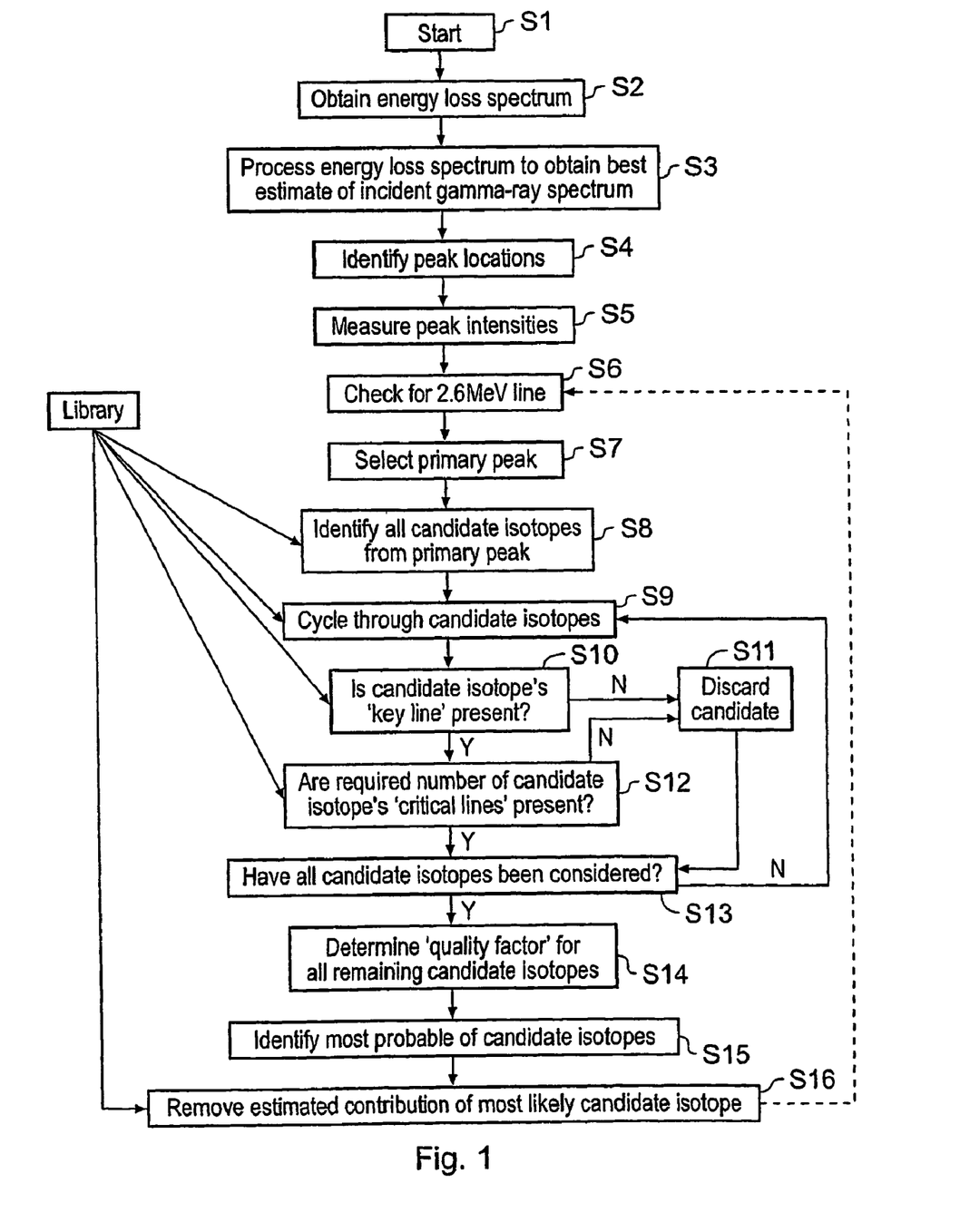
FIG. 1 is a flow chart schematically showing a method of identifying radioactive isotopes according to an embodiment of the invention.

FIG. 1 shows a flow chart schematically representing a method of identifying radioactive isotopes in an environment according to an embodiment of the invention. Execution the method from start to finish may be referred to as performing a scan, e.g. of an object in the environment. The method is applicable generally to many environments and situations, but by way of example it will be assumed here that the method is used to monitor (i.e. scan) cargo passing through a port in the context of policing the tracking of illegitimate radioactive isotopes.

Before describing on the method steps in more detail, a brief summary of the overall way in which the method of the embodiment shown in FIG. 1 operates is provided. The method operates by seeking to identify isotopes present in a source of gamma-rays in an iterative fashion. Each iteration seeks to identify an isotope, i.e. isotopes are identified one-at a time. An iteration comprises steps S6 to S16 (i.e. repeated iterations comprise repetitions of steps S6 to S16). Thus each run through of steps S6 to S16 is referred to here as an iteration. In this example, the iterations continue for so long as new isotopes continue to be identified as being present in the source. Once it is determined according to the steps of the method there are no more new isotopes to be identified (or that no isotopes have been identified at all), the process of isotope identification is complete and the method stops so that appropriate action can be taken based on the isotopes identified.

The method steps are now discussed in more detail.

The method starts at step S1.

In step S2, an energy-loss spectrum for radiation in the environment of the object to be scanned is obtained using a conventional scintillator-based gamma-ray spectrometer. The spectrometer may be a relatively small-scale device for portable hand-held applications, for example for close proximity scanning of a cargo or person of interest. Alternatively, the gamma-ray spectrometer may be a larger fixed installation device, for example one suitable for scanning vehicles as they pass (e.g. a portal monitor), such as described in WO 05/116691[2].

Figure 2:
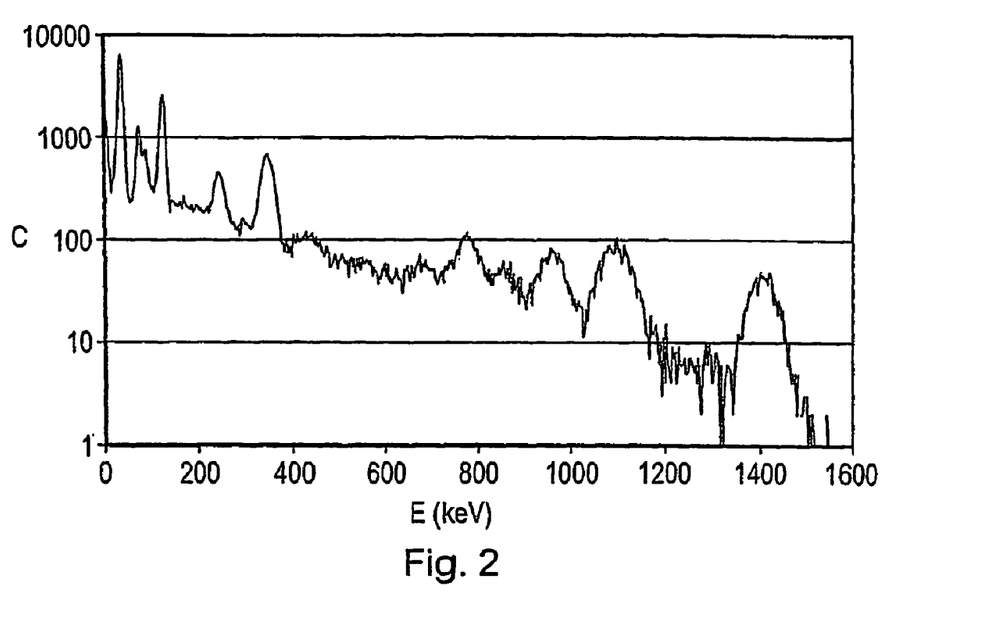
FIG. 2 is a graph schematically showing an example energy-loss spectrum obtained using a scintillator-based spectrometer during execution of the method shown in FIG. 1.

FIG. 2 is a graph schematically showing an example energy-loss spectrum obtained in Step S2. The graph plots count rate C as a function of energy E and may be obtained in the normal way. The spectrum in this example corresponds to the emission from a source of radiation containing europium-152. This radioactive isotope primarily emits gamma-rays at energies at 122 keV, 344 keV, 779 keV, 964 keV, 1112 keV and 1408 keV, and also x-rays at energies of around 40 keV.

In step S3, the energy-loss spectrum obtained at step S2 is processed to obtain an estimate of the most probable gamma-ray spectrum incident on the gamma-ray spectrometer. This may done using techniques similar to those described in WO 02/31536 [3], for example. This type of processing takes into account the theoretically predicted energy-response of the spectrometer employed to obtain the energy-loss spectrum. The theoretical predicted energy response is based on characteristics of the scintillation material used, the dimensions of the scintillation body, and characteristics of the photo-detector employed in the spectrometer. The response may be computed at different energies in a range, for example from 10 keV to 3 MeV, or even up to 12 MeV, depending on the range of gamma-ray energies likely to be encountered in use. Furthermore, a characterisation of the spectrometer's performance as a function of energy may be made using experimental data. The empirical energy response of the detector may again be made over a range of energies. A synthesis of the predicted and the experimentally determined spectrometer responses can then be made to construct a model of the spectrometer's energy response, which includes both the theoretical predictions and the experimental performance data over the energy range of interest. The approach allows the detector response to be de-convolved from the measured energy-loss spectrum obtained at step S2 (i.e. by properly allocating partial energy-deposits resulting, for example, from Compton scattering events into to the appropriate energy bin), in order to obtain an estimate of the gamma-ray spectrum incident on the spectrometer. For simplicity, the most probable gamma-ray spectrum incident on the gamma-ray spectrometer will sometimes simply be referred to here as the "measured" or "recorded" gamma-ray spectrum (i.e. references to "measured" and "recorded" spectra are to be taken as references to spectra following processing in accordance with step S3, unless the context demands otherwise).

Figure 3:
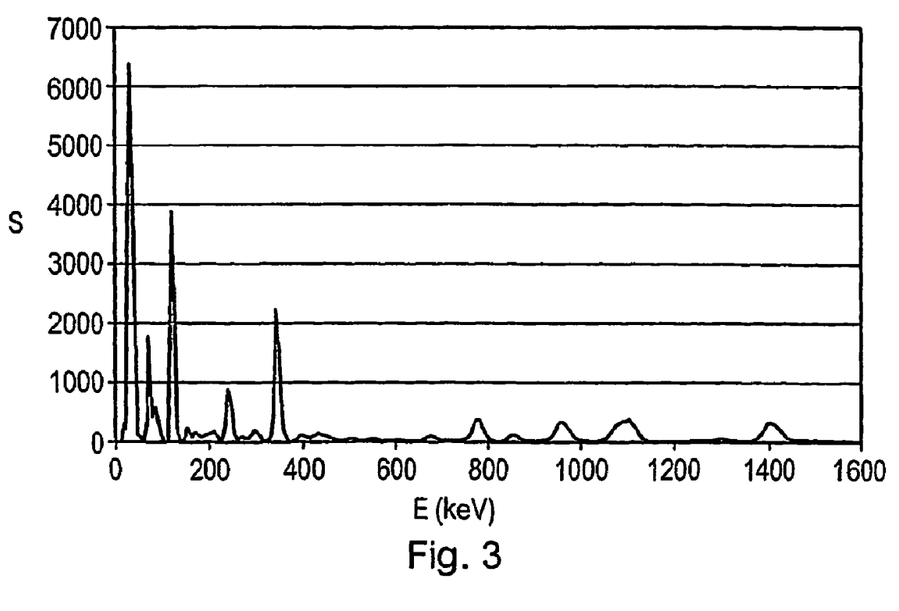
FIG. 3 is a graph schematically showing the estimated incident gamma-ray energy spectrum obtained from processing of the energy-loss spectrum shown in FIG. 2 during execution of the method shown in FIG. 1.

FIG. 3 is a graph schematically showing the incident gamma-ray energy spectrum S determined from processing of the Eu-152 energy-loss spectrum shown in FIG. 2. FIG. 3 shows how the spectral processing performed at step S3 helps to clarify (sharpen) the peaks in the gamma-ray emission spectrum from the source.

Referring again to FIG. 1, in Step S4 the locations of the peaks in the estimated incident energy spectrum are determined. This can be done using any known peak-search algorithm, for example algorithms based on the Mariscotti technique [4] may be used.

Figure 4:
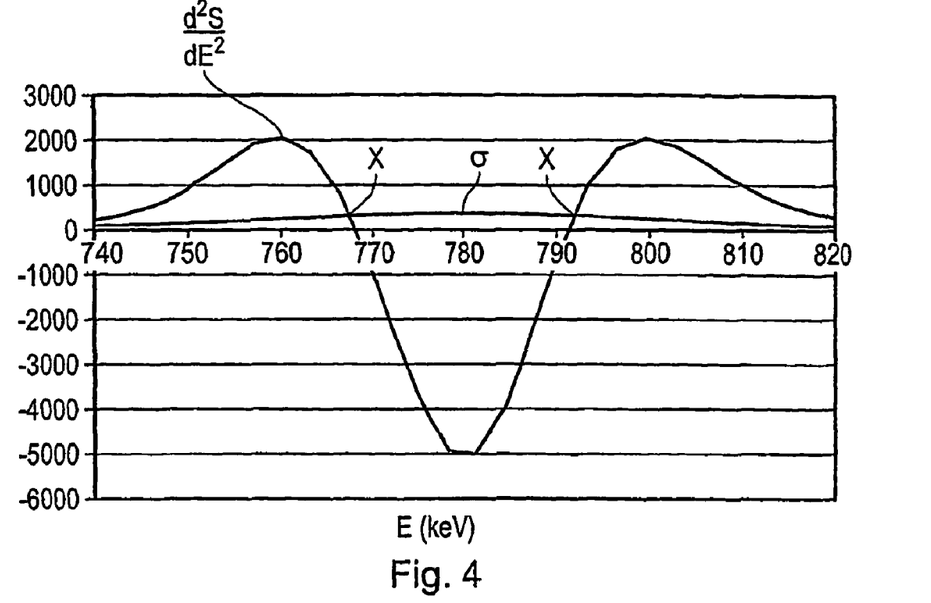
FIG. 4 is a graph schematically showing the second derivative and the standard deviation of a portion of the estimated incident gamma-ray energy spectrum shown in FIG. 3 obtained during execution of the method shown in FIG. 1.

FIG. 4 is a plot demonstrating the principles underlying a peak search algorithm based on the Mariscotti technique which the inventors have found to suitable for use in the method shown in FIG. 1. The plot in FIG. 4 corresponds to a smaller portion of the curve shown in FIG. 3, i.e. a portion in the vicinity of the 779 keV emission line from the Eu-152 source. For this energy range, two curves are shown in FIG. 4. A first curve, marked $d^2S/dE^2$, plots the second derivative of the incident energy spectrum shown in FIG. 3. A second curve, marked $\sigma$, plots the standard deviation of the incident energy spectrum shown in FIG. 3 ($\sigma=\sqrt{S_E}$ where $S_E$ is the number of counts in a 6 keV wide energy bin in the incident energy spectrum shown in FIG. 3). A portion of the spectrum will be considered to include a peak (as opposed to a noise artefact) if two criteria are met. Firstly, the absolute magnitude of $d^2S/dE^2$ towards the centre of the potential peak must be greater than $\sigma$. Secondly, $d^2S/dE^2$ must rise above $\sigma$ on either side of the centre of the proposed peak, as indicated in FIG. 4 by the arrows labelled X. Once a portion of the spectrum is identified as corresponding to a peak, the energy (i.e. location) of the peak it determined. It is not necessary that this is done with any great degree of accuracy, for example, it may simply be estimated to the nearest energy channel number. E.g. it will be sufficient to simply take the energy bin in which $d^2S/dE^2$ is at its minimum as being the energy of the peak. Other ways may also be used. For example, the energy of the peak may be taken to be the midpoint between the energies corresponding to the positions marked in FIG. 4 by the arrows labelled X, or the location of maximum in the spectrum S shown in FIG. 3 in the vicinity of the peak. This peak search process is repeated until the locations of all of the peaks in the spectrum have been identified.

In step S5, the intensities of the peaks identified in step S4 are determined. This can be done by summing the signal S plotted in FIG. 3 over the extent (width) of each peak. This may be done in the usual way and by applying conventional techniques for determining the magnitude of a peak in a spectrum. For example, the width of the peak may be determined from the locations at which the curve S shown in FIG. 3 falls to the same level of the standard deviation $\sigma$. A background signal may also be subtracted (e.g. corresponding to the standard deviation $\sigma$) before summing to determine the integrated peak intensity. For example, the background in the vicinity of each peak may be calculated from a linear interpolation from estimates of the background on either side of the peak (possibly on either side immediately adjacent the peak under consideration, or possibly from further away if there are adjacent peaks which prevent the count rate falling to the assumed threshold in the immediate to vicinity of the peak being investigated).

Figure 5:
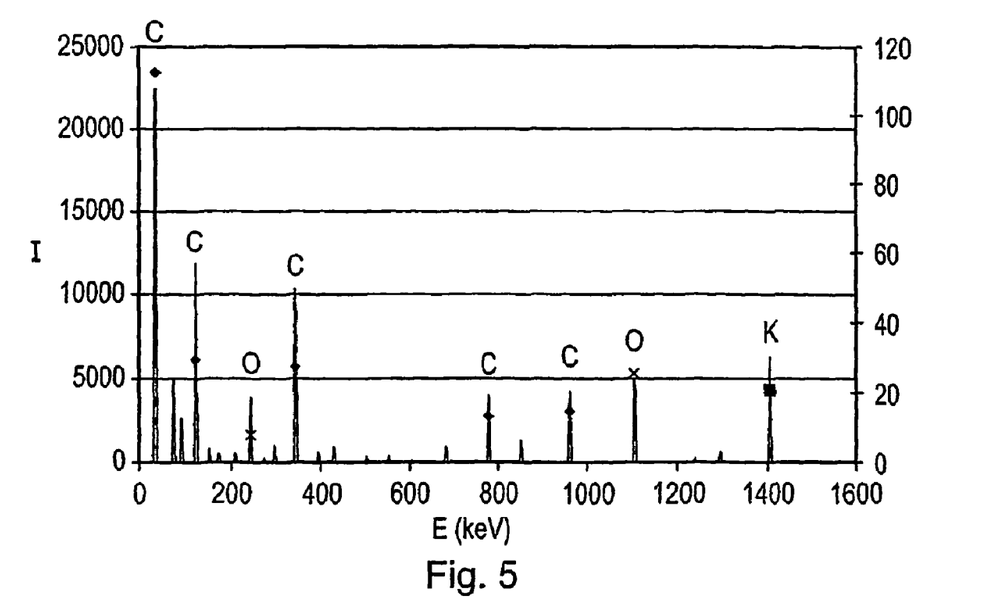
FIG. 5 is a graph schematically showing the locations and magnitudes of peaks in the estimated incident gamma-ray energy spectrum shown in FIG. 3 determined during execution of the method shown in FIG. 1.

Thus the result of the processing up to (and including) step S5 is a list of the locations (energies) and magnitudes (intensities) of the peaks in the gamma-ray emission spectrum from the source under investigation (e.g. a lorry cargo). FIG. 5 is a graph schematically showing a quasi-spectrum representing these peak locations and magnitudes. For each identified peak (of which in this case there are twenty-four in total), the magnitude I of the peak as determined in step S5 is plotted at the appropriate energy location E determined in step S4. The determined energies and magnitudes of these peaks in the measured spectrum form the basis for the isotope identification process.

An important aspect of the remaining steps of the method shown in FIG. 1 is the use of a library (database) of spectral data for isotopes expected to be encountered in the application at hand. These are the isotopes which are desired to be identifiable, and are referred to here as isotopes of interest. For each isotope of interest, the library contains a listing of the energies and relative intensities of gamma-ray emission lines associated with that isotope. For example, for radium-226, the library might contain information on fourteen emission lines. The spectral data in the library may be derived from standard data tables.

The spectral data also comprise a ranking for each emission line. The emission lines are ranked according to their significance and ability to uniquely identify their isotope. One emission line for each isotope is classified as a "key" line. This is the emission line considered most likely to be present in a gamma-ray spectrum obtained for the isotope, irrespective of environmental conditions (e.g., irrespective of the degree of shielding, spectrometer-source geometry and so on). The choice of which line is deemed to be the key line for a given isotope will depend on the intensity, energy and uniqueness of the various emission lines for that isotope. The key line should be one of the isotope's stronger lines, but should also preferably be at a relatively high energy so that it is not too readily absorbed by moderate shielding. Furthermore, the key line will ideally be at an energy which is not associated with strong emission lines from any other isotopes of interest.

A selection of other lines in the emission spectrum for each isotope of interest are classified as "critical" lines (an isotope's key line may also be classified as one of its critical lines). Critical lines will generally be relatively strong lines which are spread over a range of energies and considered to have a good chance of being present in any gamma-ray spectrum obtained for the isotope. By way of example, if a total of fourteen lines are listed in the library for radium-226, five or so may be classified as critical lines.

Finally, for each isotope of interest, the library contains an indication of the minimum number of critical lines (i.e. a critical-line threshold) which required to correspond with peaks in the gamma-ray emission spectrum from the source for a positive determination that the source includes that isotope. (In alternative embodiments the library may not contain a separate critical-line threshold for each isotope. Instead, a fixed threshold may be used, for example, an absolute fixed threshold, such as three, or four, critical lines for all isotopes of interest, or a fractional fixed threshold, such as a half or a third of the total number of critical lines for each isotope.)

Lines in the library other than the "key" and "critical" lines may be classified as "other" lines.

The relevance of the key, critical and other lines in the library, and also the critical-line threshold numbers, are explained further below.

By way of example, in one simple scheme for classifying the lines in the library as key, critical or other, emission lines may parametererised by determining the product of their energy and relative strength, and then classified according to the resulting energy-relative strength product. The line having greatest energy-relative strength product might thus be classed as the key line, with the next highest few lines being classified as critical lines (e.g. those having an energy-relative strength product above a given amount). Nonetheless, a line with a high energy-relative strength product may still not be classified as a key or critical line if it is likely to be easily confused with, or swamped by, other common lines (e.g. the electron-positron annihilation line at 511 keV or lines from other isotopes). An appropriate number of critical lines for a given isotope will depend on the nature of its spectrum. If there are a high number of strong, well-defined and distinctive lines at relatively high energies, there may be a correspondingly high number of critical lines defined. If, on the other hand, there are only a few such lines, there may only be a correspondingly few number of critical lines defined. It will, however, be appreciated that other classification schemes may be used, and furthermore, the scheme may be modified based on experimental results. For example, if during routine testing with known sources it is found that the method repeatedly fails to identify particular isotopes, the lines of that isotope may be re-classified, for example by replacing the key line with another one of the critical lines.

Table 1 schematically represents an extract of the data in a typical library. The extract shows data for six isotopes identified by the columns headed "Element" and "Atomic Number", i.e. data for Na-22, Eu-152, K-40, Co-57, Co-60 and Ga-67 are shown (the library will typically contain data for many other isotopes).

The column headed "Number of lines" gives the total number of lines for each isotope in the library. For example, this column shows there are eight lines for Eu-152 included in the library.

The energies of the emission lines and their relative intensities for each isotope are listed in the columns collectively headed "Energies of the main lines (keV)/relative intensities in italics". For example, three lines are listed for Co-57. These lines are at energies of 122.06 keV, 136.47 keV and 692.03 keV, and these lines have relative intensities of 86.5, 10.68 and 0.157 respectively.

The number of critical lines for each isotope is given in the column headed "Number of Critical lines". Thus for Eu-152 there are 5 critical lines listed in the library.

The classification of the lines as "key", "critical" or "other" is apparent from their position in the listing in the table. The first emission line listed for each isotope is the key line (i.e. the isotope listed in the left-most of the columns headed "Energies of the main lines (keV)/relative intensities in italics"). Thus the key line for Eu-152 is the emission line at an energy of 1408 keV. The critical lines are also listed in turn in the table. In this example, the key lines are also considered critical lines. Thus for Eu-152 the five critical lines are the first five listed in the table, namely the lines at 1408 keV (also the key line), 1100 keV, 964 keV, 121.78 keV and 344.3 keV.

As noted above, the lines may primarily be classified as key or critical according to both their energy and relative strength. It may be noted here that the key line for Eu-152 is not the strongest line in the library for this isotope (the line at 121.78 keV is around half as strong again). However, the higher energy of the 1408 keV line means it is likely to be seen in more spectra as it will less affected by any shielding there may be around the source. Hence this line is preferred as the key line.

The remaining lines in the library (e.g. for Eu-152 the lines at 778.9 keV, 244.6579 keV and 41.33 keV) are the lines classified as other lines.

The minimum number of critical lines (i.e. the critical-line threshold) required to correspond with peaks in the gamma-ray emission spectrum from the source for a positive determination that the source includes that isotope is given for each isotope in the column headed "Number of Required lines". For example, of the five critical lines included in the library for Eu-152, at least three are required to correspond with peaks in the gamma-ray emission spectrum from the source for a positive determination that the source includes Eu-152.

Finally, the column headed "Isotope Category" gives an indication of the risk class of each isotope. For example, common naturally occurring isotopes (e.g. K-40) are classified here by the number 1. Other numbers may be used for other classifications. For example, the number 3 is used here for isotopes commonly used in medicine, and the number 4 for isotopes commonly used in industry. Other numbers may be used for special nuclear material, and isotopes whose presence is generally regarded as being suspicious and a cause for concern.

TABLE 1

| Isotope Category | Number of Line | Number of Critical lines | Number of Required lines | Element | Atopole Number | Energies of the main lines (kav)/relative intensities in italics | | | | | |
|---|---|---|---|---|---|---|---|---|---|---|---|
| 4 | 2 | 2 | 2 Na | 22 | 1274 99.4 | 511 99.4 | | | | | |
| 4 | 8 | 5 | 3 Eu | 152 | 1408 21.21 | 1100 25.6 | 984 14.58 | 121.78 29.24 | 344.3 27 | 775.9 12.99 | 244.6579 7.583 | 41.33846 39 |
| 1 | 1 | 1 | 1 K | 40 | 1460.63 10.87 | | | | | | |
| 4 | 3 | 2 | 1 Co | 57 | 122.08 85.6 | 138.47 10.68 | 692.03 0.157 | | | | |
| 4 | 2 | 2 | 2 Co | 60 | 1173.24 89.974 | 1332.5 99.985 | | | | | |
| 3 | 5 | 4 | 3 Ga | 67 | 184.58 21.2 | 93.16 42.36 | 383.53 4.68 | 300.22 16.8 | 208.85 2.4 | | |

Having described the library and the line, classification scheme, the remaining steps of the method shown in FIG. 1 are now described.

In step S6 it is determined whether one of the peaks identified at step S4 is at energy of around 2600 keV (i.e. 2.6 MeV). If not, no specific action is taken and processing continues to step S7. If, on the other hand, it is determined that one of the peaks in the spectrum is at an energy of around 2600 keV, processing still continues to step S7, but a flag is raised so that the action taken at step S7 can be modified as described below. A line at 2600 keV is significant here since this line is a good indicator that one (or more) of Th-232, U-232, or Th-228 is present, and these are all isotopes likely to be of particular interest. The spectrum might be considered to include a line at 2600 keV if, for example, one of the peaks identified at step S4 is estimated to be at an energy of between 2550 keV and 2650 keV, for example.

In step S7, one of the peaks identified in the measured gamma-ray emission spectrum from the source is selected as a primary (or starting) peak. If a line at 2600 keV was identified in step S6, this will be taken to be the starting peak. If not, the starting peak for typical applications will simply be the strongest of the peaks identified in the measured spectrum. The particular selection of stating peak is not crucial.

In step S8, an initial set of candidate isotopes are selected from the isotopes in the library based on the starting (primary) peak. These candidate isotopes have the potential to be positively identified as being present in the source for the current iteration (isotopes not identified as candidate isotopes at this stage may nonetheless be identified in subsequent iterations).

Isotopes of interest in the library which include an emission line corresponding to the starting peak are the isotopes taken as candidate isotopes. An isotope of interest in the library will be considered to include an emission line corresponding to the starting peak if it includes an emission line at an energy that falls within an energy window about the starting peak. For example, the energy window might span the range $E_s-dE_s$ to $dE_s+dE_s$, where $E_s$ is the energy of the chosen starting peak. The inventors have found that a value of $dE_s$ of $0.01E_s+8$ keV gives good results. If the width of the energy window is made too large, too many candidate isotopes are identified. If, on the other hand, the energy window is too narrow, isotopes which are present in the source may not be identified as candidate isotopes because of inaccuracies in the starting peak energy, for example because of calibration errors in the gamma-ray spectrometer.

Thus step S8 results in a list of candidate isotopes taken from the isotopes of interest for the current iteration of the method. Isotopes of interest which do not have an emission line falling within the defined energy window around the starting peak are not included in the list of candidate isotopes determined in step S8 (i.e. they are discarded so far as the present iteration is concerned). However, as noted above, the method operates iteratively to identify isotopes one at a time and isotopes discarded during one iteration may nonetheless be positively identified as being present in the source of the gamma-rays in a subsequent iteration. Accordingly, references to discarding isotopes, and isotopes being removed from the list of candidate isotopes, should be understood as relating only to the present iteration. It should not be understood as a final exclusion of these isotopes from being identified as present in the source.

In step S9, one of the candidate isotopes is selected for further processing. All of the candidate isotopes will undergo the same further processing in turn, and so it does not matter which one is selected first. If it is determined in step S9 that there are no candidate isotopes to consider because none were identified in the preceding step S8, processing returns to step S7 where another of the peaks in the measured spectrum is taken as the primary/starting peak, for example, the next strongest peak (this processing path is not shown in FIG. 1 for simplicity). If still no candidate isotopes are identified in step S8, processing will again cycle back to S7 where still another starting peak is selected. This loop will continue until at least one candidate isotope is found in step S8, or all of the peaks in the spectrum have been exhausted. If all peaks are exhausted without a candidate isotope being determined, the method stops. If this happens on the first iteration of the method, there is a finding that none of the isotopes of interest are present in the source. If it happens on subsequent iterations there is a finding that there are no more isotopes of interest in the source other than those (if any) which have been positively identified as being present in previous iterations. If there is at least one candidate isotope to consider, processing continues to step S10.

In step S10, a determination is made as to whether the measured spectrum includes the key line of the candidate isotope presently under consideration (i.e. the isotope selected in step S9). The measured spectrum is considered to include the key line of the isotope under consideration if one of the peaks identified in the measured spectrum at step S4 (i.e. as shown in FIG. 4) is at an energy which falls within a defined energy window surrounding the isotope's key line. The energy window may, for example, span the range $E_k-dE_k$ to $E_k+dE_k$, where $E_k$ is the energy of the key line. The inventors have found that a value of $dE_k$ of $0.01E_k+8$ keV gives good results in balancing the need to take account for possible inaccuracies in energy measurement, and the desire to avoid wrongly concluding that the key line is present in the measured spectrum when it is not.

If it is determined in step S10 that the key line is not present, processing follows the 'N' branch to step S11. In step S11 the candidate isotope under consideration is discarded (i.e. it is removed from the list of candidate isotopes for the present iteration). Processing then proceeds to step S13 which is discussed further below.

If it is determined in step S10 that the measured spectrum does include the key line of the candidate isotope under consideration, processing follows the branch to step S12.

In step S12, a determination is made as to whether the measured spectrum includes at least the minimum number of critical lines (the critical-line threshold) defined in the library as being required for a positive determination that the source includes the candidate isotope presently under consideration. This is done by counting the number of critical lines of the candidate isotope currently under consideration which correspond with peaks identified in the measured energy spectrum from the source. (It is noted that in this embodiments the key line for an isotope is also considered a critical line for that isotope, however, in other embodiments it may not be.) The measured spectrum is taken to include a peak corresponding to a given critical line if one of the peaks identified in the measured spectrum at step S4 (i.e. as shown in FIG. 4) is at an energy which falls within a defined energy window surrounding the energy of the critical line. The energy window may, for example, span the range $E_c-dE_c$ to $E_c+dE_c$, where $E_c$ is the energy of the critical line under consideration. The inventors have found that a value of $dE_c$ of $0.01E_c+8$ keV gives good results in balancing the need to take account for possible inaccuracies in energy measurement, and the desire to avoid wrongly concluding that a critical line is present in the measured spectrum when it is not.

If it is determined in step S12 that the measured spectrum does not include at least the minimum number of critical lines defined in the library as being required for a positive identification of that candidate isotope, processing follows the 'N' branch from step S12 to step S11. As noted above, in step S11 the candidate isotope is discarded and processing moves to step S13.

If it is determined in step S12 that the measured spectrum does include at least the minimum number of critical lines required for a positive identification of that candidate isotope, the isotope is maintained as a candidate isotope, and processing follows the 'Y' branch from step S12 to step S13.

In step S13 it is determined whether or not all of the candidate isotopes identified at step S8 have been cycled through. If not, processing follows the N branch and returns to step S9 where the next candidate isotope is selected. As before it does not matter in which order the isotopes are selected for further processing. Once the next candidate isotope is selected, processing continues to step S10 in the manner described above. If it is determined in step S13 that all candidate isotopes have already been considered (i.e. there have been enough cycles through step S9 that all potential candidate isotopes have been considered), processing follows the 'Y' branch from step S13 to step S14, which is discussed further below.

Thus the result of the processing up to step S13 is a list of the isotopes of interest in the library (if any) which satisfy the following requirements: (i) the isotope includes the starting peak in the measured spectrum identified in step S6 as one of its critical lines; (ii) the measured spectrum includes the key line for the isotope (step S10); and (iii) the measured spectrum includes at least the required number of the isotope's critical lines (step S12). The isotopes of interest (if any) which have been found to satisfy these three requirements (and so have not been discarded for this iteration) may be referred to as remaining candidate isotopes for the iteration at hand.

In step S14, a quality factor Q is determined for the remaining candidate isotopes (i.e. the candidate isotopes identified in step S8 which were not discarded during their respective iterations through steps S9 to S12). If there are no remaining candidate isotopes for the present iteration (i.e. because all have already been discarded), the method comes to a halt. If this happens on the first iteration, there is a to finding that none of the isotopes of interest are present in the source. If it happens during a subsequent iteration, there is a finding that there are no more isotopes of interest in the source other than those (if any) that have been positively identified as being present in previous iterations.

The quality factor Q is a measure of how well the remaining candidate isotopes' spectral features match the measured spectrum. The quality factor may, for example, be derived from an estimate of each isotope's contribution to the total number of counts in the observed spectrum and/or a measure of how well the emission lines for that isotope match the lines identified in the measured spectrum (e.g. total number, relative line strengths etc.). The quality factor for each isotope may thus provide a quantitative indication of the goodness-of-fit for each of the remaining candidate isotopes' spectra with the observed data.

In step S15 the most probable of the remaining candidate isotopes is determined, i.e. a determination is made as to which one of the remaining candidate isotopes is to be taken as being positively identified as being present in the source of the gamma-ray spectrum. Any other of the remaining candidate isotopes are discarded.

If there is only one remaining candidate isotope at step S15, this is the isotope taken as being positively identified as being present in the source of the measured gamma-ray spectrum. If there are multiple remaining isotopes, one of them is selected as being positively identified. There are a number of ways in which the remaining candidate isotope which is deemed most likely to be present in the source of the measured gamma-ray spectrum (and hence taken to be positively identified) can be selected. In this example embodiment, the candidate isotope with the greatest quality factor is taken to be the one positively identified as being present in the source. The remaining candidate isotopes with lower quality factors Q are thus the isotopes discarded for this iteration. In other embodiments other techniques may be employed. For example, the remaining candidate isotope having the greatest number of its critical lines identified in the measured gamma-ray spectrum may be taken to be the positively identified isotope.

Thus the result of the processing in step S15 is that one of the isotopes of interest in the library is deemed to be positively identified in the source of the gamma-ray spectrum obtained in step S3.

In step S16, the estimated contribution of the isotope positively identified in step S15 is removed from the estimate of the incident gamma-ray spectrum obtained in step S3. This is done by subtracting the contributions of each of the emission lines listed in the library of isotopes of interest for the positively identified isotope from the peak intensities determined in step S5 (for the first iteration), or from the peak intensities remaining from the previous iteration (for subsequent iterations). The lines are subtracted in accordance with their relative intensities as specified in the library. The weakest of the critical lines identified as being present in the measured spectrum at step S12 is used to scale the magnitude of the contributions of the different emission lines of the positively identified isotope. Using the weakest of the critical lines to scale the signal contributions to be subtracted helps to ensure that contributions from isotopes not yet identified, but having emission lines overlapping with emission lines of the positively identified isotope are not wrongly removed. Thus the result of step S16 is a modification of the peak intensities that were initially determined in step S5 (and which may having been previously modified in earlier iterations). Following the removal of the estimated contribution of the positively identified isotope in step S16, processing returns to step S6 for the next iteration, i.e., the next attempt to positively identify one of the isotopes of interest in the library as being present in the source of the gamma-ray spectrum. Subsequent iterations differ from the first iteration in that the first iteration is based on the measured spectrum as obtained at step S3 and subsequently identified peak locations and energies (at steps S4 and S5), whereas processing in subsequent iterations is based on the peak locations and energies after they have been modified by the removal of the estimated contributions of isotopes positively identified in previous iterations (i.e. at step(s) S16 in each of the previous iterations). It is noted that the subtraction of estimated contributions of isotopes positively identified in previous iterations may in effect lead to modified peak locations as well as modified peak intensities. This is because some peaks may be subtracted entirely, thus meaning there is no longer a peak at that location.

Thus to summarise step S16; following the identification of the most probable candidate isotope, its line contributions to the spectrum are removed in the appropriate ratios based on the observed intensity of the weakest feature seen in the spectrum as indicated by the library. The resulting spectrum may then re-analysed in order to to identify further isotopes.

Thus the method continues to iterate through steps S6 to S16 with isotopes of interest being positively identified in each iteration. As noted above, the estimated contribution of a positively determined isotope is subtracted from the spectrum in Step S16 in an amount based on the weakest identified line. This conservative approach means a significant contribution from the isotope can remain. This means the same isotope may be positively identified again in a subsequent iteration by virtue of this remaining contribution. If this happens, the estimated contribution of the isotope to the spectrum as a whole is taken to be the sum of the contributions determined in the various iterations in which the isotope is identified. The iterations through steps S6 to S16 continue until there is a finding that there are no more isotopes to identify, whereupon the method stops. As noted above, this can happen at step S9 (because it is determined here that no candidate isotopes were identified at step S8 for the current iteration for any of the lines identified in the spectrum), or in step S13 (because it is determined here that all of the candidate isotopes identified at step S8 of the current iteration were discarded in step S11 for failing to meet the requirements of step S10 or step S12).

The number of iterations through steps S6 to S16 before the method stops (at step S9 or step S13) will determine how many isotopes from the library of interest are positively identified as being present in the source of the energy spectrum obtained in Step S3. There may be no isotopes positively identified (i.e. the method stops during the first iteration), or there may be only one isotope identified (i.e. the method stops during the second iteration), or there may be multiple isotopes identified (i.e. the method stops during subsequent iterations).

Once the method has stopped, the resulting output is a list of the isotopes of interest in the library which are positively identified as being in the source. It will often be useful to also maintain an estimate of amount of each positively identified radioactive isotope present in the source. This can be based on the strength of the emission lines in the measured spectrum associated with each isotope determined in the normal way (e.g., based on the estimated contribution of isotope to the spectrum determined at step S16).

Following completion of the isotope identification process, appropriate action may be taken based on which isotopes have been positively identified and the application at hand. For example, the appropriate action may simply be to display the results to a user so that the user can decide what (if anything) to do next. Alternatively, the method may further include a step (not shown in FIG. 1) of automatically deciding what action to take. For example, in a monitor for use in policing the illegitimate trafficking of radioactive isotopes, if the list of positively identified isotopes is empty, or contains only acceptable naturally occurring isotopes (e.g. medical iodine), an indication may be provided that the presently scanned person or cargo is "clean" and so may proceed. The method may then simply repeat again from step S1 to perform another scan, possibly immediately so that scanning is in effect continuous, or possibly after allowing time for the next person or cargo to be positioned for scanning (or for the scanning apparatus to be moved to the next person or cargo to be scanned). However, if the list of positively identified isotopes contains an isotope that is considered to be hazardous, e.g. weapons grade plutonium (possibly also taking account of the calculated amount of the isotope present), an indication may be provided that the presently scanned person or cargo is suspect, and should not be allowed to proceed without undergoing further investigation. For example, an alarm may be raised and/or a bather may be closed to prevent the person or cargo from moving. Alternatively, a silent alarm may be raised to an operator who may decide on how to proceed.

In addition to providing an indication of the nature and amounts of radioactive isotopes in a scanned object, the method may also provide an indication of the confidence with which the individual isotopes have been identified. This may be based, for example, on the quality factor Q determined for the isotope at step S14 in the iteration in which it was positively identified. This could then be taken into account when determining what action to take in response to the results of a scan. For example, if the scan determines that the scanned object includes a dangerous isotope, but with only a small degree of confidence, this might be further investigated in a relatively low-key fashion. If, on the other hand, the presence of the dangerous isotope is determined with a high degree of confidence, an immediate large-scale alarm response my be initiated.

Furthermore, by comparing the relative strengths of lines identified for an isotope in the measured spectrum with the relative strengths of the lines for that isotope in the library, characteristics of any shielding around the source can be determined. For example, if the relative strengths of the lines identified in the measured spectrum closely match those expected from the library, it may be determined there is minimal shielding (i.e. no energy dependent absorption). If, on the other hand, the lowest-energy lines are seen to be weaker than expected, it may be determined there is some level of moderate shielding so that low energy radiation from the source is absorbed. Similarly, if only the highest-energy lines are seen in the measured spectrum, it may be determined there is more extensive shielding.

Thus the above-described method provides a reliable and robust way of identifying one or more radio-isotopes in a source. Furthermore, this is done in a manner which is relatively insensitive to shielding and may be achieved using a relatively low-resolution gamma-ray spectrum, for example of the type acquired using a standard scintillation-body based spectrometer.

The method operates in a manner which is primarily based on comparing the energies of peaks in a gamma-ray spectrum obtained from the object with the energies of emission lines associated with radioactive isotopes of interest stored in a library (database). Because the method does not attempt to fit templates which takes account of the energies and relative intensities of all of the peaks in a spectrum, the above-identified problems with the prior art techniques, i.e. intensive processing requirements and incorrect isotope identification, are reduced.

It will be appreciated that FIG. 1 shows only one specific embodiment of the invention, and that the method may be modified in a number of ways.

For example, in the embodiment shown in FIG. 1, one of the requirements for an isotope of interest to be positively identified is that the measured spectrum includes a peak which corresponds with an emission line which is classified as the "key" line for that isotope. In other embodiments this requirement may be relaxed or strengthened. For example, the requirement may be relaxed by classifying multiple emission lines of the isotopes of interest in the library as key lines, and requiring only one of the key lines to be present in the measured spectrum. The requirement may similarly be strengthened by classifying multiple emission lines as key lines and requiring all of them to be present in the measured spectrum. In still other embodiments; there may be no requirement based on key lines at all. For example, the library may not classify any of the emission lines as key lines, and there may be no processing step in the isotope identification process which corresponds to step S10 of FIG. 1. In these embodiments, candidate isotopes would be maintained or discarded in each iteration only on the basis of whether or not they contain the requisite number of critical lines.

Many other modifications of the method are possible. For example, once processing reaches step S4, steps S1 to S3 may be repeated in parallel with the remaining steps S4 to S16. Thus, when all isotopes have been identified from the spectrum obtained at step S3, another spectrum is (or will soon become) available for another run through steps S4 to S16. This can allow confidence in the result to be built up as more spectral data are obtained while allowing an early indication of isotopes present in a source to be made available from the first run through.

In other examples, instead of identifying the single most likely candidate isotope at step S15, a statistical approach might be taken. For example, if there are two remaining isotopes at step S14, and it is determined at step S15 that one has a quality factor double the other, the method may determine that both isotopes are present in a ratio determined from the relative quality factors. Thus the estimated contributions from both isotopes may be removed in step S16 in appropriate ratios (for example in the ratio 2:1 based on the quality factors).

Furthermore, the method steps may be performed in an order different from that shown in FIG. 1. For example, steps S10 and S12 could be reversed with no effect on the results. In some embodiments, steps of the method may be performed simultaneously. For example, if speed of processing is important, the cycling through steps S9 to S12 for each candidate isotope could be performed in parallel, rather than in a cyclic manner. In other examples steps may be omitted. For example, step S8 could be emitted with steps S9 to S12 being performed for all isotopes of interest in the library. In other embodiments step S14 could be omitted, e.g., where the most probable of the remaining candidate isotopes at step S15 is not to be selected on the basis of the quality factors, and where there is no desire to provide an estimate of statistical confidence in the identification.

Figure 6:
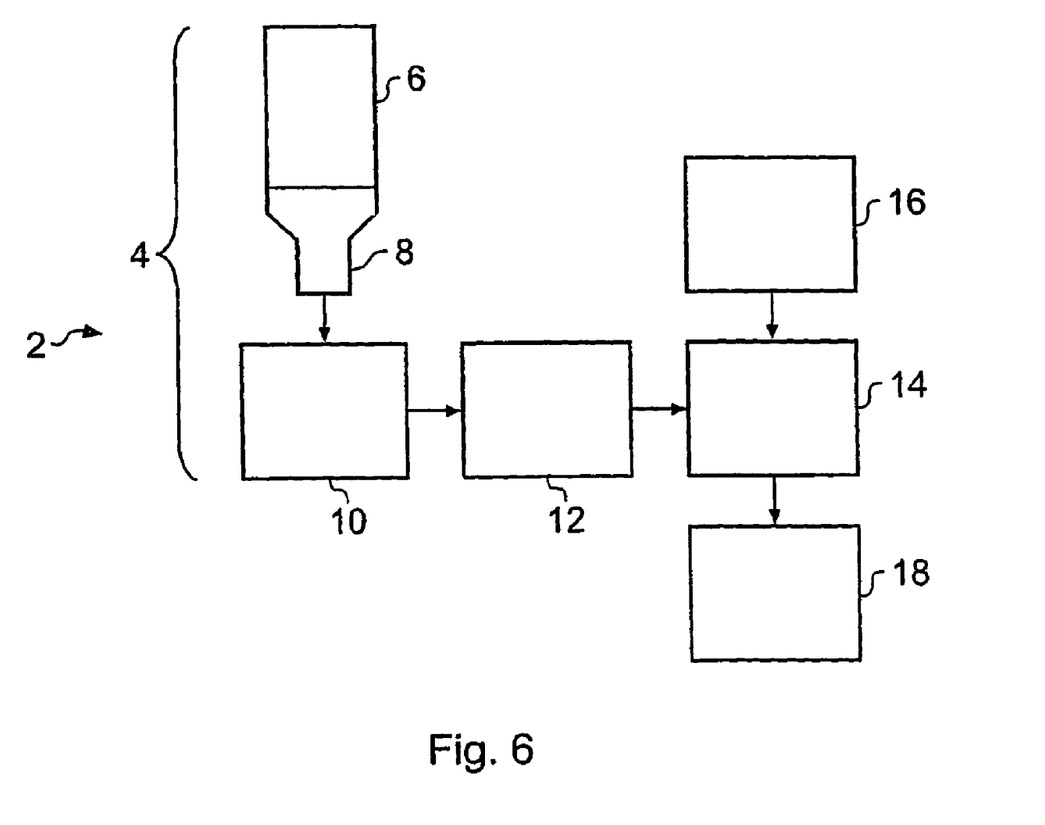
FIG. 6 schematically shows an apparatus configured to identify radioactive isotopes according to an embodiment of the invention.

FIG. 6 schematically shows a radioactive-isotope identifying device (RID) 2 according to an embodiment of the invention. The RID 2 is configured to identify isotopes using the method shown in FIG. 1. The RID 2 comprises a scintillator based gamma-ray spectrometer 4, energy-loss spectrum processing circuitry 12, isotope identification circuitry 14, a database 16 comprising the library of spectral data used at steps S8, S10, S12 and S16 of the method shown in FIG. 1, and a display 18. The gamma-ray spectrometer 4 may be conventional and comprises a scintillation body 6, a photodetector, in this case a photo-multiplier tube (PMT) 8, and energy loss-spectrum acquisition circuitry 10. The energy loss-spectrum acquisition circuitry 10 is for obtaining energy loss spectra in accordance with step S2 of the method shown in FIG. 1. The energy-loss spectrum processing circuitry 12 is configured to perform step S3 of the method shown in FIG. 1. The isotope identification circuitry 14 is configured to perform steps S4 to S16 of the method shown in FIG. 1. The display 18 is for displaying results (e.g. a listing of the positively identified isotopes) to a user.

The energy loss-spectrum acquisition circuitry 10, the energy-loss spectrum processing circuitry 12, and the isotope identification circuitry 14 may all be provided by a suitably programmed general purpose computer, for example a personal computer, a PDA type device, or other form of computer workstation. Furthermore, the storage medium 16 containing the spectral data may be a memory (e.g. RAM or ROM) of the computer. However, it will be appreciated that other implementations are possible. For example, in an embodiment of the invention, a network of computers, rather than a stand-alone computer may be used. Alternatively, or in addition, at least some of the functionality of the invention may be implemented by means of special purpose hardware, for example in the form of special purpose integrated circuits (e.g. Application Specific Integrated Circuits (ASICs), or Field Programmable Gate Arrays (FPGAs)), or firmware.

The results of the isotope identification process may be displayed on the display 18 in near real time. Furthermore, the RID 2 may be configured to use a relatively short integration time to obtain the energy loss spectrum in step S2 so that a first indication the positively identified isotopes can be quickly displayed to a user. The method may then be performed multiple times with the gamma-ray spectra obtained in each step S2 being added to previously obtained spectra to improve statistical accuracy, and hence confidence in the identification. Where an estimate of the confidence of the identification (e.g. as determined from the quality factors obtained in step S14) is displayed to a user, the user may choose to keep repeating the method until he is satisfied with the estimated confidence of the identification process (i.e. there is no need to predetermine the integration time for obtaining the measured spectrum).

The RID may also include auto-setup, auto-calibration and auto-stabilisation features. The auto-setup process may commence by using a low value for the high-voltage and gain settings of the PMT so that a spectrum of a calibration source is within the RID's dynamic range. The RID may then calibrated several times, e.g. three times, using different high voltage values in order to derive an estimate of the energy corresponds to the maximum energy channel number (e.g. this might typically be channel 1024). This information may then be processed to select the high voltage to use so that channel 1024 is equivalent to the desired maximum energy (e.g., 3,000 keV). The auto-calibration feature may rely on features of the isotope identification procedure to calibrate the detector. This can be done, for example, by identifying peaks in the measured spectrum from a known calibration source using the method shown in FIG. 1 up to step S4), and comparing the results with the known emission lines of the calibration source. A calibration curve, e.g. a second order polynomial, may then be determined which allows the measured peak locations for the calibration source to be transformed to the known peak locations. The calibration curve can be checked by checking that the isotopes in the calibration source are properly identified by the RID. The auto-stabilisation feature may rely on features produced by a known isotope in the environment, e.g. K-40, by ensuring that the known emission lines from this isotopes are correctly located (e.g. by ensuring for K-40 that the main peak at 1465 keV is properly located). This may be achieved either by adjusting the high voltage on the PMT, or by adjusting the gain setting.

Finally, it will be understood that although the above has described embodiments of the invention employing scintillator-based gamma-ray spectrometers, the measured gamma-ray spectra to be processed in accordance with embodiments of to the invention may equally be obtained using other spectrometers including Hyper-pure Germanium detectors and detectors having a modest spectral resolution compared with cooled Hyper-pure Germanium detectors. For example, Mercuric iodide, CdZnTe or CdTe are room-temperature semiconductors detectors which provide a spectral-resolution comparable with that of the processed spectrum from a scintillation spectrometer obtainable from the processing at step S3 of the method shown in FIG. 1. Consequently, in some embodiments these types of spectrometer could be used to obtain an energy loss spectrum from a source/object of interest, and processing similar to that shown in FIG. 1 performed without a step corresponding to step S3.

It will be appreciated that although particular embodiments of the invention have been described, many modifications/additions and/or substitutions may be made within the scope of the present invention. Accordingly, the particular examples described are intended to be illustrative only, and not limitative. Furthermore, it will be understood from the above description that features of embodiments of the invention may be combined in ways other than those explicitly set out in the appended claims.

REFERENCES

[1] Gosnell, T. B., Hall, J. M., Ham, C. L., Knapp, D. A., Koenig, Z. M., Luke, S. J., Pohl, B. A., Schach von Wittenau, A., Wolford, J. K., *Gamma-Ray Identification of Nuclear Weapon Materials*, Lawrence Livermore National Laboratory, UCRL-ID-127436, 3 Feb. 1997.
[2] WO 05/116691 (Symetrica Limited).
[3] WO 02/31536 (Symetrica Limited).
[4] Mariscotti, M. A. J., *A Method for Automatic Identification of Peaks in the Presence of Background and its Application to Spectrum Analysis*, Nuclear Instruments and Methods, Vol. 50. p. 189, 1967.

The invention claimed is:

1. A method of identifying radioactive components in a source, the method comprising:
   (a) obtaining a gamma-ray spectrum from the source;
   (b) using at least one processor to identify peaks in the gamma-ray spectrum;
   (c) using said at least one processor to determine an array of peak energies and peak intensities from the identified peaks;
   (d) using said at least one processor to identify an initial source component based on a comparison of the peak energies with a database of spectral data for radioactive isotopes of interest, the spectral data comprising energies, relative intensities and classification information for emission lines association with radioactive isotopes of interest, wherein the emission lines are classified according to a predetermined significance according to their ability to identify the radioactive isotope with which they are associated;

(e) using said at least one processor to estimate a contribution of the initial source component to the peak intensities;

(f) using said at least one processor to modify the array of peak energies and peak intensities by subtracting the estimated contribution of the initial source component; and (g) using said at least one processor to identify a further source component based on a comparison of the modified array of peak energies with the database of spectral data.

2. A method according to claim 1, wherein the comparison of the peak energies with the database of spectral data includes selecting a primary peak energy from the array of peak energies, and determining which radioactive isotopes of interest in the database of spectral data include an emission line at an energy corresponding to the selected primary peak energy.

3. A method according to claim 2, wherein the selected primary peak energy is the peak energy associated with a peak having the greatest peak intensity.

4. A method according to claim 2, further comprising determining whether one of the identified peaks has a peak energy corresponding to 2.6 MeV, and if so, taking this to be the selected primary peak energy.

5. A method according to claim 1, wherein the comparison of the peak energies with the database of spectral data includes determining for a selection of isotopes of interest whether an emission line of a first classification in the database for the isotope has an energy that corresponds with one of the peak energies.

6. A method according to claim 1, wherein the comparison of the peak energies with the database of spectral data includes determining for a selection of isotopes of interest whether a predetermined number of emission lines of a second classification in the database for the isotope have energies which correspond with ones of the peak energies.

7. A method according to claim 1, further comprising calculating a goodness-of-fit parameter for the identified source components based on a comparison between the energies and relative intensities of emission lines associated with the identified source components in the database of spectral data with the peak energies and peak intensities determined from the gamma-ray spectrum.

8. A method according to claim 1, wherein estimating and subtracting the contribution of the initial source component at steps (e) and (f) includes identifying a plurality of the peak energies for the peaks in the gamma-ray spectrum corresponding to emission lines in the database for the initial source component, comparing the peak intensities associated with the identified plurality of peak energies with the corresponding relative intensities in the database, identifying the peak in the gamma-ray spectrum having the lowest intensity relative to the relative intensity of its corresponding emission line in the database, and subtracting a contribution from the peak intensities for each of the plurality of peak energies identified as being associated with the initial source component, the amount subtracted from each peak intensity being in accordance with the relative intensities of associated emission lines in the database, and scaled such that the peak in the gamma-ray spectrum having the lowest intensity relative to its corresponding emission line in the database is removed.

9. A method according to claim 1, further comprising:

(h) estimating a contribution of the further source component to the modified array of peak intensities;

(i) further modifying the array of peak energies and peak intensities of subtracting the estimated contribution of the further source component; and (j) identifying a still further source component based on a comparison of the further modified array of peak energies with the database of spectral data.

10. A method according to claim 9, further comprising repeatedly performing steps (h), (i) and (Q) to iteratively identify still further source components.

11. A method according to claim 1, wherein step (a) comprises obtaining an energy loss spectrum from the source using a scintillation counter, and processing the energy loss spectrum to provide the gamma-ray spectrum.

12. A method according to claim 11, wherein processing the energy loss spectrum includes deconvolving a pre-determined response of the scintillation counter to incident gamma rays from the energy loss spectrum.

13. A method according to claim 1, wherein step (a) comprises obtaining the gamma-ray spectrum from the source using a room-temperature semiconductor detector.

14. A method according to claim 13, wherein the room-temperature semiconductor detector is a Cadmium Telluride based detector.

15. A method according to claim 1, further comprising providing an output depending on the identified source components.

16. A method according to claim 1 comprising a database of spectral data including entries corresponding to emission lines of radioactive isotopes of interest, the entries including energies and relative intensities for the emission lines, and wherein the emission lines in the database are classified according to a predetermined significance according to their ability to identify the radioactive isotope with which they are associated.

17. A computer program product comprising a non-transitory computer readable medium storing machine readable instructions for implementing the method of claim 1.

18. An apparatus configured to implement the method of claim 1.

19. An apparatus configured to identify radioactive components in a source, comprising:

a gamma-ray spectrometer configured to obtained a gamma-ray spectrum from the source, a storage means configured to store a database of spectral data, and a processor operable to (a) identify peaks in the gamma-ray spectrum, (b) determine an array of peak energies and peak intensities from the identified peaks, (c) identify an initial source component based on a comparison of the peak energies with the database of spectral data for radioactive isotopes of interest, the spectral data comprising energies, relative intensities and classification information for emission lines association with radioactive isotopes of interest, wherein the emission lines are classified according to a predetermined significance according to their ability to identify the radioactive isotope with which they are associated, (d) estimate a contribution of the initial source component to the peak intensities, (e) modify the array of peak energies and peak intensities by subtracting the estimated contribution of the initial source component, and (f) identify a further source component based on a comparison of the modified array of peak energies with the database of spectral data.

* * * * *